United States Patent [19]

Gabano et al.

[11] Patent Number: 4,690,877
[45] Date of Patent: Sep. 1, 1987

[54] ELECTROCHEMICAL CELL HAVING A NON-AQUEOUS ELECTROLYTE

[75] Inventors: Jean-Paul Gabano, Poitiers; Michel Broussely, Liguge; Jean-Pierre Pereira-Ramos, Creteil; Richard Messina, Boussy Saint Antoine; Jacques Perichon, Savigny sur Orge, all of France

[73] Assignee: Saft, S.A., Romainville, France

[21] Appl. No.: 821,157

[22] Filed: Jan. 21, 1986

[30] Foreign Application Priority Data

Jan. 30, 1985 [FR] France .................. 8501309

[51] Int. Cl.$^4$ .................. H01M 6/14
[52] U.S. Cl. .................. 429/194; 429/197
[58] Field of Search .................. 429/194, 197

[56] References Cited

U.S. PATENT DOCUMENTS 3,544,385 12/1970 Newman .................. 429/197
3,907,597 9/1975 Mellors .................. 429/197

Primary Examiner—Brian E. Hearn
Assistant Examiner—Stephen J. Kalafut
Attorney, Agent, or Firm—Kenyon & Kenyon

[57] ABSTRACT

A cell operable at temperatures between 100° C. and 200° C. includes a non-aqueous electrolyte which comprises at least one solvent belonging to the class of aromatic or aliphatic linear sulfones. The negative active material of the cell may be lithium, for example, and its positive active material is selected from the group constituted by oxides, oxisalts, and sulfides. The electrolyte includes as a solvent, in particular, dimethylsulfone alone or mixed with other aromatic or aliphatic linear sulfones.

3 Claims, 4 Drawing Figures

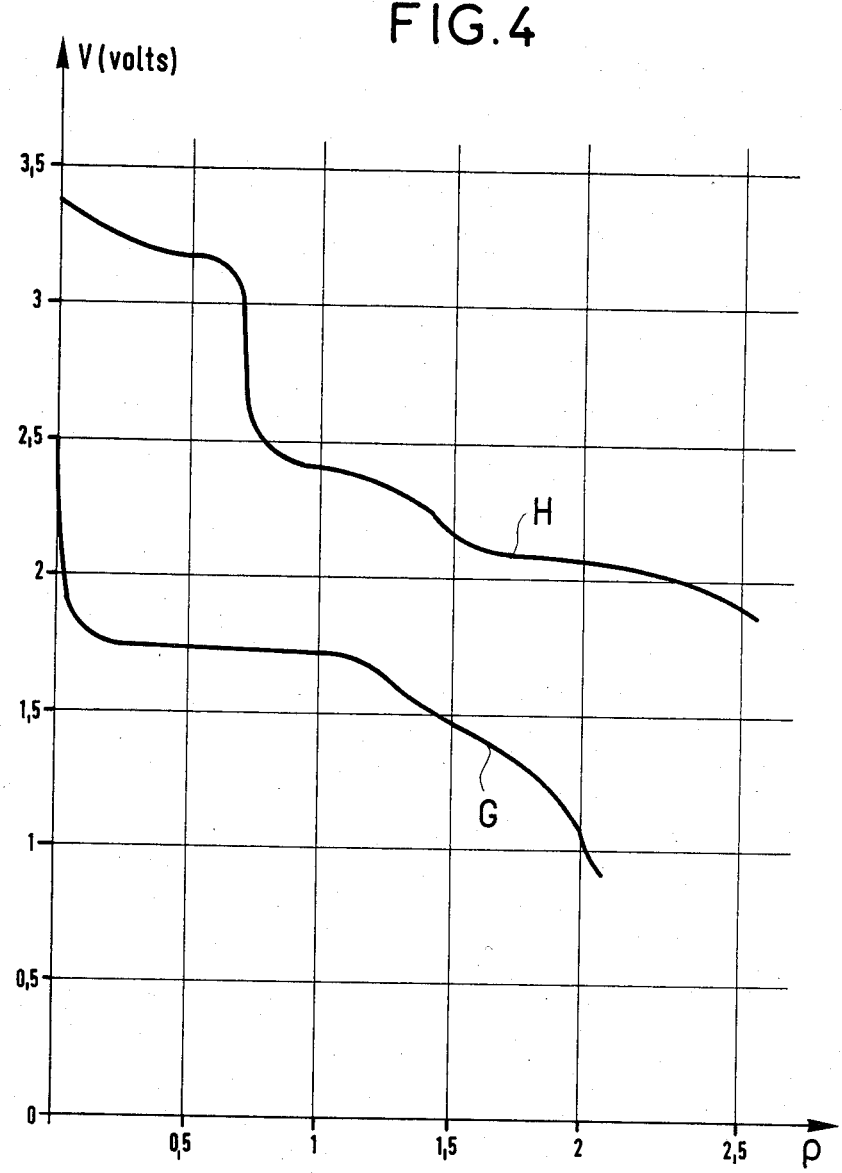

ELECTROCHEMICAL CELL HAVING A NON-AQUEOUS ELECTROLYTE

The present invention relates to an electrochemical cell having a non-aqueous electrolyte, and in particular to a cell in which the negative active material is chosen from the group constituted by the alkali metals, the alkaline earths, magnesium, and aluminum, and in which the positive active material is chosen from the group constituted by: oxides, oxisalts, sulfides, and halides of transition metals.

BACKGROUND OF THE INVENTION

The present invention relates particularly to cells of the above-specified type and suitable for operating at high temperatures, e.g. lying in the range 100° C. to 200° C. This range of temperatures corresponds to the conditions in which batteries are used in applications relating to geothermics and oil prospecting.

Attempts have been made to implement electrolytes in such generators in which the solvents were cyclic sulfones of the sulfolane or the 3-methylsulfolane type, because these compounds are liquid at ambient temperature. However, their chemical and electrochemical stabilities have turned out to be quite inadequate in the above-mentioned range of temperatures.

The aim of the present invention is to provide an electrochemical cell capable of solving this problem.

SUMMARY OF THE INVENTION

The present invention provides an electrochemical cell having a non-aqueous electrolyte, in which the negative active material is selected from the group formed by alkali metals, alkaline earths, magnesium, and aluminum, the invention including the improvements whereby the positive active material is selected from the group constituted by CuO, $Cu_4O(PO_4)_2$, $CF_x$, $MnO_2$, $V_2O_5$, $MoS_3$, $TiS_2$, $V_2S_5$, $V_6O_{13}$, $MoS_2$, $NiPS_3$, and said non-aqueous electrolyte contains at least one solvent belonging to the class of aromatic or aliphatic linear sulfones.

The solvent is preferably dimethylsulfone. A mixture of solvents may alternately be used.

When the negative active material is lithium or aluminum-lithium, the electrolyte solute is advantageously selected from the group constituted by $LiClO_4$, $LiBF_4$, $LiCF_3SO_3$, $LiAlCl_4$, and $LiAsF_6$.

BRIEF DESCRIPTION OF THE DRAWINGS

Embodiments of the invention are described by way of example with reference to the accompanying drawnings, in which:

FIG. 4 is a graph showing discharge curves.

MORE DETAILED DESCRIPTION

Figure 1:
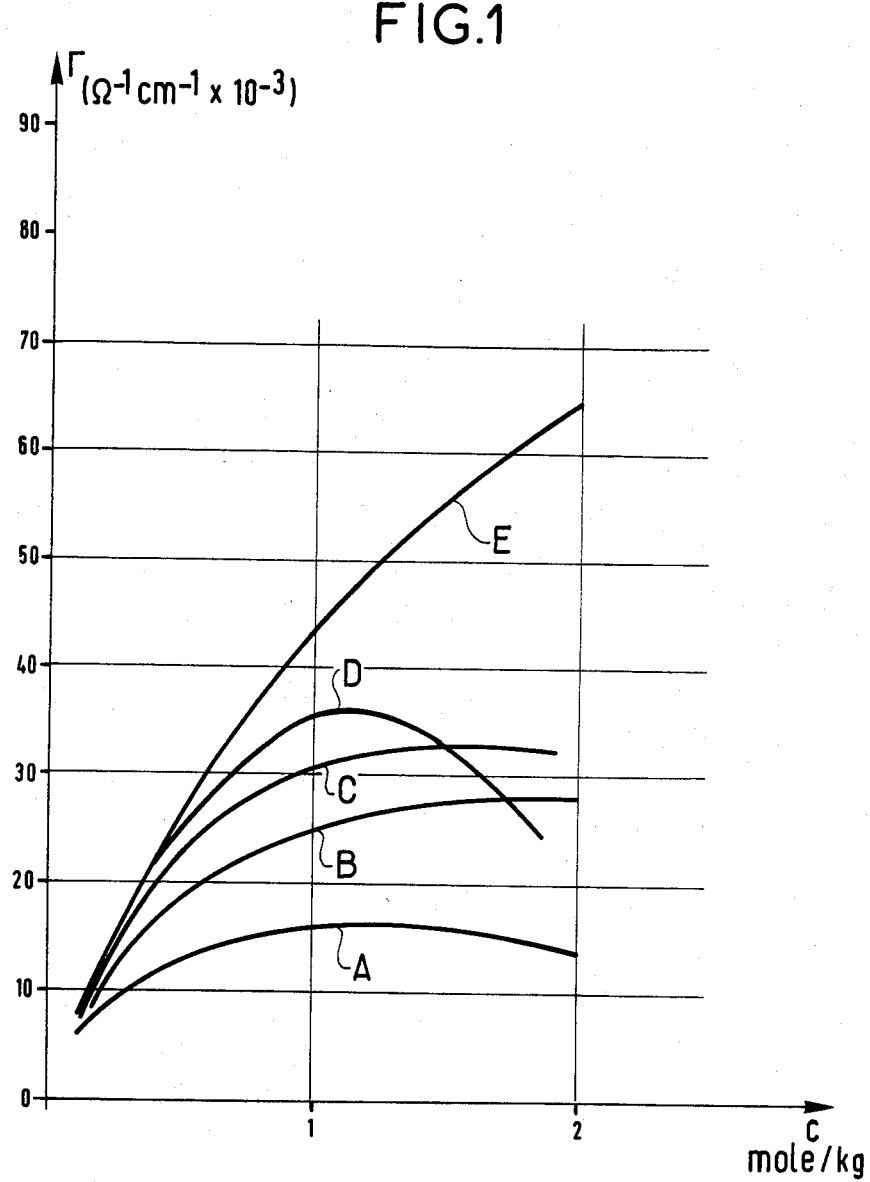
FIG. 1 is a graph showing the change in specific conductivity $\Gamma$ of the electrolyte in a cell in accordance with the invention as a function of the concentration c of various solutes, and at a temperature T of 150° C.
Figure 2:
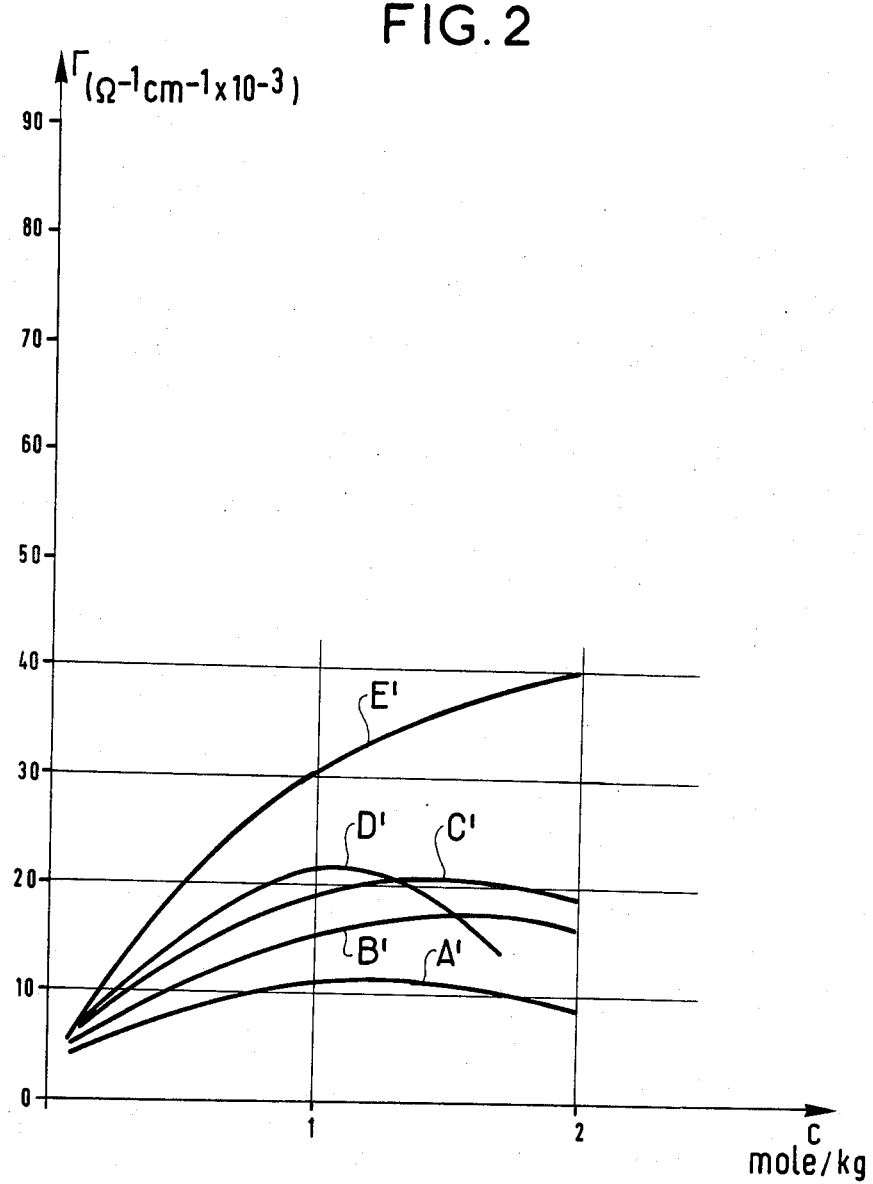
FIG. 2 is a graph similar to FIG. 1, but at a temperature T of 107° C.

Various electrolytes in accordance with the invention have been prepared by dissolving the solutes in dimethylsulfone. Their specific conductivities $\Gamma(\Omega^{-1}cm^{-1})$ as a function of the concentration c (moles/kg) of the solutes in the electrolytes are shown at two different temperatures: namely 150° C. in FIG. 1 and 107° C. in FIG. 2. In these figures:

curves A and A' relate to $LiCF_3SO_3$;
curves B and B' relate to $LiBF_4$;
curves C and C' relate to $LiClO_4$;
curves D and D' relate to $LiAlCl_4$; and
curves E and E' relate to $LiAsF_6$. ;

Particular notice should be taken of the very high values obtained using lithium hexafluorarsenate whose conductivity, unlike the conductivity of the other solutes, continues to increase with increasing concentration.

Thus 2M solution of $LiAsF_6$ in dimethylsulfone has a specific conductivity equal to $70 \times 10^{-3} \Omega^{-1} cm^{-1}$ at a temperature of 150° C.

Figure 3:
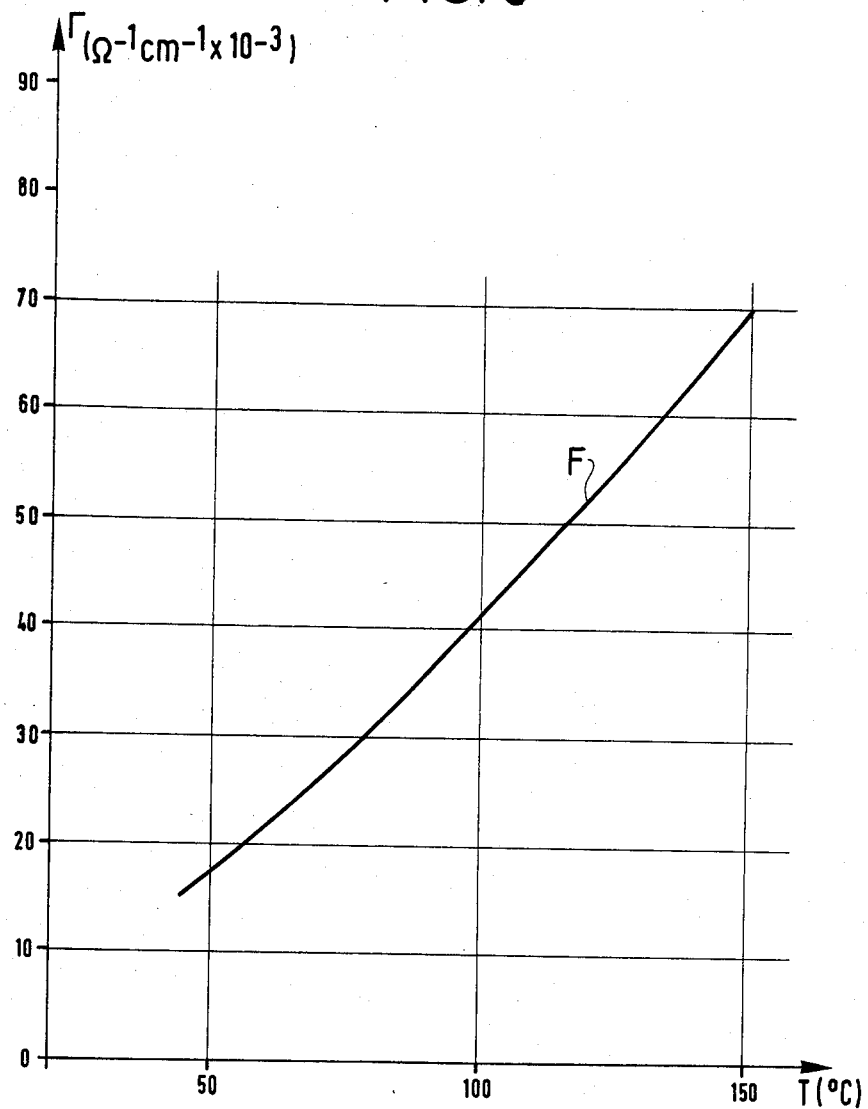
FIG. 3 is graph showing variations in specific conductivity $\Gamma$ of one example of an electrolyte in accordance with the invention as a function of temperature T.

FIG. 3 is a graph in which the single curve F shows the variations in specific conductivity $\Gamma$ of this solution as a function of temperature T (between 50° C. and 150° C.). Although dimethylsulfone has a relatively high melting point (107° C.), it may be observed that the electrolyte solution remains completely clear down to 50° C. and retains perfectly acceptable conductivity at that temperature. This property which is a feature of the dimethylsulfone/$LiAsF_6$ system makes it possible, most advantageously, to extend the range of temperatures over which such an electrolyte can be used to include values which are considerably lower than those at which the pure solvent melts.

In a variant implementation, a plurality of solvents in accordance with the invention are mixed together. Eutectic compositions as determined from binary or ternary phase diagrams are used. Such eutectics are suitable for providing new complex solvents making use of linear or aromatic sulfones and providing, in conjunction with the above-specified solutes, a family of electrolytes having particularly advantageous properties.

The above-mentioned electrolytes are usable, in particular, in cells having a negative active material of lithium or of lithium-aluminum, and having a wide range of positive active materials, taking account of the range of electroactivity of such electrolytes, which may be as much as 5 volts at 150° C. In addition, such electrolytes have very little tendency to solvate ions. This increases the range of positive materials having reversible intercalations which can be used, since the presence of non-solvated $Li^+$ ions facilitates the process without giving rise to severe structural degradation.

By way of example, negative electrodes have been made using a CuO base and also a $V_2O_5$ base. These electrodes had a surface area of about 1 cm$^2$ and a thickness of about 0.2 mm. They contained 3 mg of active material mixed with 90% high purity graphite. The mixture was compressed on a 1 cm$^2$ platinum grid. The electrolyte was a 2M solution of $LiAsF_6$ in dimethylsulfone.

FIG. 4 shows the voltages V measured as a function of efficiency p expressed in Faradays/mole for galvanoplastic reduction performed at 1 mA and 150° C. Curve G corresponds to CuO and curve H corresponds to $V_2O_5$.

Naturally, lithium could be replaced by one of the other above-mentioned negative active materials, and CuO or $V_2O_5$ could be replaced by one of the other above-mentioned positive active materials.

We claim:

1. An electrochemical cell having a negative active material, a positive active material, and a non-aqueous electrolyte, the cell being capable of operation in a temperature range between 100° C. and 200° C., wherein the negative active material is selected from the group consisting of alkali metals, alkaline earths, magnesium, and aluminum, the positive active material is selected from the group consisting of CuO, $Cu_4O(PO_4)_2$, $CF_x$, $MnO_2$, $V_2O_5$, $MoS_3$, $TiS_2$, $V_2S_5$, $V_6O_{13}$, $MoS_2$, and $NiPS_3$, and wherein said nonaqueous electrolyte consists of at least one solvent selected from the group consisting of dimethylsulfone alone and mixtures of dimethylsulfone with other aromatic or aliphatic linear sulfones.

2. An electrochemical cell according to claim 1, wherein said electrolyte includes a plurality of solvents constituting eutectic compositions as determined from binary or ternary phase diagrams.

3. An electrochemical cell according to claim 1 or 2, wherein said negative active material is lithium or lithium-aluminum, and wherein the electrolyte solute is selected from the group consisting of $LiClO_4$, $LiBF_4$, $LiCF_3SO_3$, $LiAlCl_4$, and $LiAsF_6$.

* * * * *